RADIO ALARM SYSTEM

Filed June 3, 1955 2 Sheets-Sheet 1

INVENTORS
LOUIS CANTO,
HARRY F. MOHR AND
KARL L. NEUMANN
BY
Charles H. Brown
ATTORNEY INVENTORS
LOUIS CANTO,
HARRY F. MOHR AND
KARL L. NEUMANN
BY
Charles H. Brown
ATTORNEY 2,912,676

RADIO ALARM SYSTEM

Louis Canto, Brooklyn, Harry F. Mohr, Flushing, and Karl L. Neumann, Yonkers, N.Y., assignors to Radio Corporation of America, a corporation of Delaware Application June 3, 1955, Serial No. 513,004

6 Claims. (Cl. 340—164)

This invention relates to a radio alarm system adapted for use in a radio communication system. Particularly, the invention is a selective ringer or alarm system which, when energized by the proper sequence and amplitude of signal voltages, will energize an indicating device, yet is relatively effectively insensitive to individual and accumulative noise voltage pulses.

The invention is herein described in connection with a radio communication system having a central station and a number of subscriber's stations. A control signal transmitted by the operation of selective transmitting equipment at the central station is automatically shifted in frequency between two signal frequencies to which filter-rectifiers at the subscriber's stations are selective. The frequency of the signal is shifted a given number of times and in a predetermined sequence or grouping in accordance with the subscriber's station that is being called. The control signal serves to bring about the energization of an indicating device at only one of the subscriber's stations. The control signals transmitted by the selective transmitting equipment at the central station, corresponding to the different subscriber's stations, include the same number of shifts in frequency, the sequence or grouping of the shifts in frequency being different in each control signal.

The selective ringer or alarm system of the invention includes a switching circuit arranged to respond to the sequence of shifts in frequency of the control signal to energize an indicating device. The switching circuits included in the alarm systems located at the subscriber's stations are arranged to respond to different sequences of shifts in frequency of the control signal. Only a particular one of the alarm systems at one of the subscriber's stations is responsive to a particular grouping of shifts in the frequency of the signal to energize an indicating device. The subscriber's stations which have not been called will receive no indication that a message is being transmitted between the central station and a selected one of the stations in the communication system. In this way, there is provided a selective ringer or alarm system which operates an indicating device only in response to a particular control signal and not accidentally in response to electrical interference or other control signals.

Among the objects of this invention are: to provide an improved radio alarm system by the use of which a central station can selectively communicate with any one of a number of subscriber's stations in a radio communication system, and which is relatively effectively insensitive to electrical signals other than the proper control signal; and to provide an improved radio alarm system which is constructed of a minimum of components assembled in a simple manner.

Figures 1, 2:
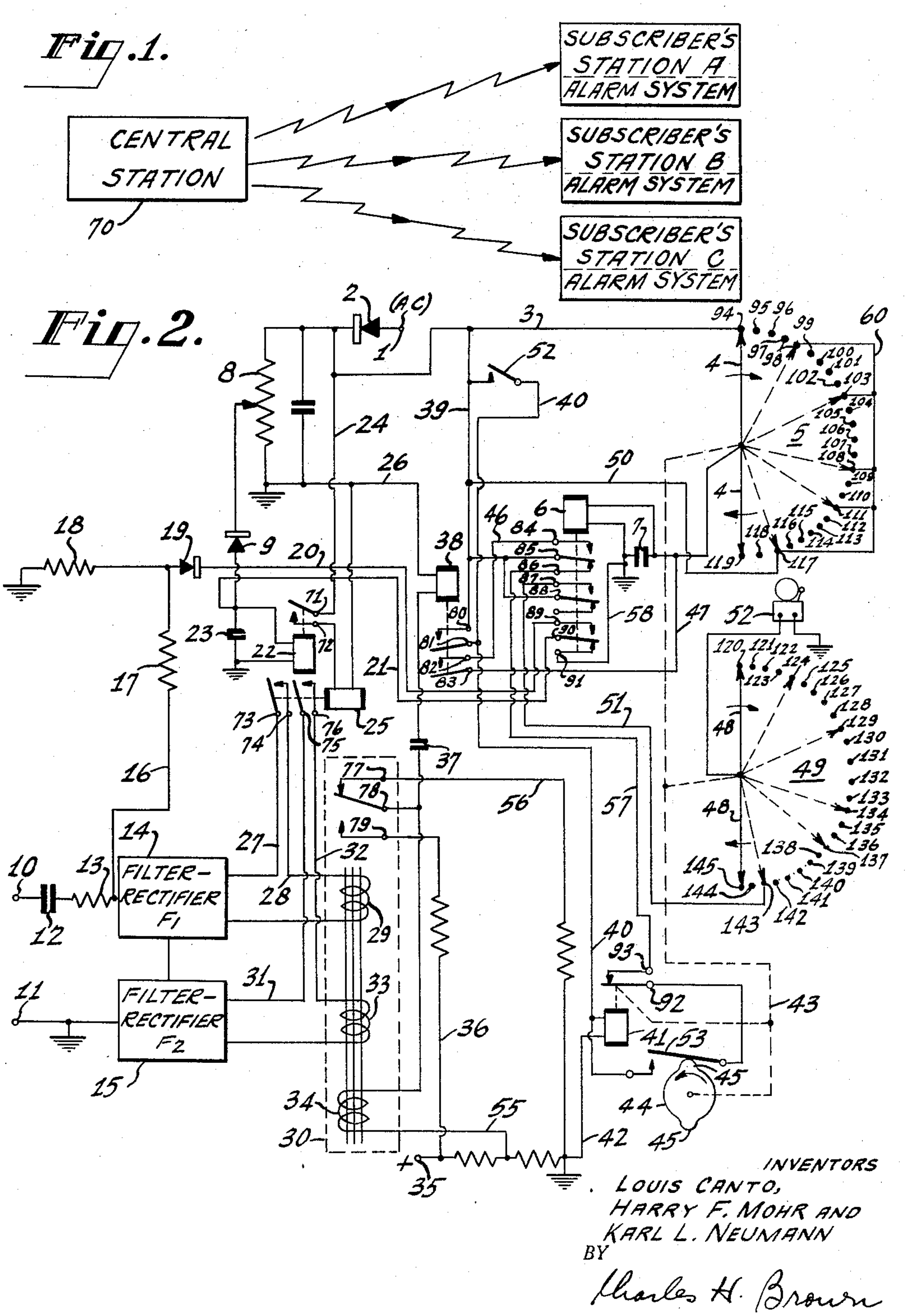
Figure 3:
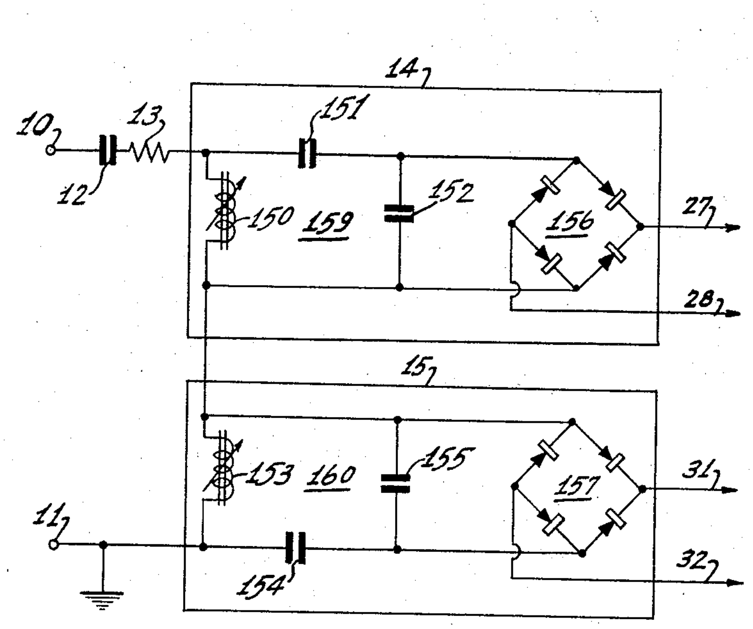

A more detailed description of the invention follows, in connection with the accompanying drawing, in which:

Figure 1 discloses a block diagram of a radio communication system arranged to include a radio alarm system of the invention;

Figure 2 discloses a circuit diagram of one embodiment of a radio alarm system constructed according to the invention; and Figure 3 discloses a circuit diagram of one embodiment of a pair of filter-rectifiers for use in the alarm system of the invention.

Referring to Fig. 1, the radio communication system includes a central station 70 and a number of subscriber's stations A, B and C. While only three subscriber's stations have been shown, it is to be understood that the communication system may include any desired number of such subscriber's stations. Suitable radio transmitting and receiving equipment are located at each of the stations and forms no part per se of the present invention. Selective equipment is located at the central station 70 which may be operated to control the operation of the transmitting equipment located thereat to transmit a control signal in addition to a regular message signal. The central station 70 is electrically connected to the subscriber's stations A, B and C by any suitable transmission medium which will facilitate the transmission of signal intelligence between the central station 70 and the subscriber's stations. For example, the communication system may be used in radiomarine communication, the central station 70 being located on land and the respective subscriber's stations being remotely located on ships spaced apart at sea. The signal intelligence will be transmitted between the central station 70 and the subscriber's stations A, B and C by some type of wireless transmission which may be, for example, voice transmission.

A radio alarm system, constructed according to the invention, is located at each of the subscriber's stations. While the description will be directed to the particular alarm system shown in Fig. 2, which will be located at one of the subscriber's stations, it is to be understood that the operation of the alarm systems located at the other subscriber's stations will be similar.

Referring to Fig. 2, there is shown a circuit diagram of one embodiment of a radio alarm system constructed according to the invention. It will be assumed that the alarm system shown is located at subscriber's station A, shown in Fig. 1, although the alarm system could be located at any of the subscriber's stations in the communication system. An alternating (A.C.) voltage is supplied via the terminal 1 of a suitable source, not shown, to a rectifier 2. The A.C. voltage is rectified by the rectifier 2, and the resulting D.C. voltage is fed to ground over a path including lead 3, contact position 94 and wiper arm 4 of a hunting switch 5 and the winding of a delay relay 6. The term ground, as used in the specification, is to be considered a point of fixed or zero alternating potential. A capacitor 7 is connected across the winding of delay relay 6. When the capacitor 7 is charged a sufficient amount, the winding of the delay relay 6 is energized and relay 6 is operated. The resulting D.C. voltage is also fed from rectifier 2 through a potentiometer 8 to a rectifier 9. A bias is applied to the rectifier 9 of a value which depends upon the setting of the potentiometer 8.

When an operator at the central station 70, shown in Fig. 1, desires to communicate with one of the subscriber's stations, he first operates the selective transmitting equipment located at the central station 70, as by means of a dial, to transmit a particular control signal. The control signal will be received at the subscriber's station which is being called as well as the other subscriber's stations, and will be fed to the terminals 10 and 11 of the alarm system shown in Fig. 2. The signal is fed through a series filter comprising capacitor 12 and resistor 13 to the input circuits of a pair of filter-rectifiers 14 and 15. The filter rectifier 14 is selective to a signal frequency $F_1$. The second filter rectifier 15 is selective to a different signal frequency $F_2$. The frequencies of the signal frequencies $F_1$ and $F_2$ are not multiples of one another and are sufficiently separated so that the selective filter-rectifiers 14 and 15 can be selective to each of the signal frequencies. The filter-rectifiers 14 and 15 are selective to the different frequencies of the control signal transmitted by the central station.

The control signal, in addition to being fed to the input circuits of the filter-rectifiers 14 and 15, is fed from the terminals 10 and 11 through capacitor 12 and resistor 13 to ground over a path including lead 16 and a resistor dividing circuit comprising resistors 17 and 18. A voltage developed across resistor 18 is rectified by rectifier 19 and is fed to ground over a path including lead 20, contact 89 and armature 90 of delay relay 6 (the delay relay 6 being normally operated by a voltage signal fed from A.C. voltage terminal 1, as previously described), lead 21 and the winding of delay relay 22. A capacitor 23 is connected across the winding of delay relay 22. Assuming that a control signal of the proper amplitude and duration is being fed to ground through resistors 17 and 18 from terminals 10 and 11, capacitor 23 is charged sufficiently to supply an energizing voltage to the winding of delay relay 22, and delay relay 22 is operated. A path is completed from the A.C. voltage terminal 1 to ground through rectifier 2, lead 24, armature 71 and contact 72 of delay relay 22, the winding of relay 25 and lead 26. The winding of relay 25 is energized and relay 25 is operated. Upon the operation of relay 25, a path will be completed across the output circuit of filter-rectifier 14 including lead 27, a switching means including armature 73 and contact 74 of relay 25, lead 28 and the winding 29 of a polar relay 30. A path will also be completed across the output circuit of filter-rectifier 15 including lead 31, a switching means including armature 75 and contact 76 of relay 25 and winding 33 of polar relay 30.

The polar relay 30 includes a single set of transfer contacts comprising an armature 78 and oppositely disposed contacts 77 and 79. In addition to the main windings 29 and 33, the polar relay 30 also includes an auxiliary winding 34 which serves to hold the armature 78 of the transfer contacts at the last made contact position 77 or 79. If the armature 78 is in engagement with contact 77, in the absence of any energization of the main windings 29 and 33, winding 34 is energized to hold armature 78 at that contact via a path completed from the positive terminal 35 of a source of unidirectional potential, not shown, to ground through lead 55, the winding 34, armature 78 and contact 77 of the transfer contacts of the polar relay 30 and lead 56. On the other hand, if the armature 78 is in engagement with contact 79, in the absence of any energization of the main windings 29 and 33, winding 34 is energized to hold armature 78 at that contact through a path completed from the positive terminal 35 to ground through lead 36, contact 79 and armature 78 of the transfer contacts of polar relay 30, the winding 34 and lead 55. It will be assumed that upon the last operation of polar relay 30, the armature 78 was left in engagement with contact 77 of the polar relay and has, therefore, been held in that position by the winding 34.

The control signal transmitted by the selective equipment at the central station will correspond to the particular subscriber's station that is being called. The frequency of the control signal will be shifted in frequency between signal frequency $F_1$ and signal frequency $F_2$. The frequency will be shifted a predetermined number of times and at a particular sequence or grouping corresponding to the subscriber's station that is being called. For example, the signal may be shifted in frequency four times in one cycle of operation of the transmitting equipment, five times in a second cycle of operation of the transmitting equipment, five times in a third cycle of operation of the transmitting equipment, three times in a fourth cycle of operation of the transmitting equipment and six times in a fifth cycle of operation of the transmitting equipment. In other words, the frequency of the signal will be shifted twenty-three times in all, the sequence of the shifts in frequency being divided into five time spaced groups. Selective equipment for controlling the transmission of a signal in this manner is well known in the art. Dialing equipment is commonly used to aid in such transmission control.

The operation of the alarm system of the invention is based on the fact that each of the alarm systems in a communication system will respond only to a particular sequence or grouping of shifts of frequency. Following the example given, all of the alarm systems will receive a control signal shifted in frequency twenty-three times in a sequence divided into five groups. Each of the alarm systems, however, will respond only to a particular sequence or grouping. The alarm system shown in Fig. 2 is arranged to respond to the sequence 4—5—5—3—6. The other alarm systems will be arranged to respond to different sequences. The invention, of course, is not limited to the example given. The total number of shifts in frequency and the grouping thereof can be varied in accordance with the equipment available and the intended use thereof. The alarm system of the invention can be arranged to respond to any one of a large number of possible control signals which could be transmitted by the selective equipment at the central station.

It has been assumed that the alarm system of the invention, shown in Figure 2, is located at subscriber's station A. It is further assumed that the operator at the central station is calling subscriber's station A.

When the operator at the central station places the selective transmitting equipment located at the central station in operation, a control signal of either signal frequency $F_1$ or signal frequency $F_2$ is transmitted. As previously described, the control signal is received by the reeciving equipment at the subscriber's station A and is fed to the terminals 10 and 11. The presence of the control signal will bring about the operation of relays 22 and 25 of the alarm system, as described above. Filter-rectifiers 14 and 15 are connected across the terminals 10 and 11 and the control signal is fed to the input circuits thereof.

Referring to Figure 3, there is shown a circuit diagram of one embodiment of a pair of filter-rectifiers which may be adapted for use in the alarm system of the invention. Two adjustable chokes 150 and 153 are connected in series across the terminals 10 and 11. The choke 150 is included in the filter circuit 159, also including capacitor 151 and 152, of filter-rectifier 14. Similarly, the choke 153 is included in the filter circuit 160, also including capacitors 154 and 155, of filter-rectifier 15. The filter circuit 159 of filter-rectifier 14 is tuned by adjusting the choke 150 to develop maximum impedance to a signal frequency $F_1$ and minimum impedance to a signal frequency $F_2$. The tuned circuit 160 of filter-rectifier 15 is tuned by adjusting the choke 153 to develop maximum impedance to signal frequency $F_2$ and minimum impedance to signal frequency $F_1$. Therefore, when the control signal is of a signal frequency $F_1$, the filter circuit 159 of filter-rectifier 14 will develop maximum impedance and a maximum voltage will be fed to the rectifier circuit 156 of the filter-rectifier 14. The output voltage of the rectifier circuit 156 is fed to the winding 29 of polar relay 30 by leads 27 and 28, as shown in Figure 2. On the other hand, when the control signal is of a signal frequency $F_2$, the filter circuit 160 of the filter-rectifier 15 will develop maximum impedance and a maximum voltage will be fed to the rectifier circuit 157 of filter-rectifier 15. The output voltage will be fed from the rectifier 157 to the winding 33 of the polar relay 30 by leads 31 and 32, as shown in Figure 2.

It will be assumed that the control signal transmitted by the selective transmitting equipment at the central station starts out with the signal frequency $F_1$. A maximum voltage will, therefore, be developed by filter-rectifier 14 and will be fed to the winding 29 of polar relay 30 over a path including lead 27, armature 73 and contact 74 of relay 25 and lead 28. Normally, the energization of winding 29 would cause the armature 78 to engage contact 77 of the transfer contacts of the polar relay 30. As it has been assumed that the armature 78 is already positioned at this contact, the energization of winding 29 by the voltage fed from the filter-rectifier 14 merely assists the winding 34 of polar relay 30 in holding the armature at the contact position.

The operator at the central station will, then, operate the selective transmitting equipment at the central station to shift the frequency of the control signal between the signal frequencies $F_1$ and $F_2$ a predetermined number of times and in a particular sequence or grouping. It has been assumed that the alarm system, as shown in Figure 2, which is located at the subscriber's station A, is arranged to respond to a control signal which is shifted in frequency twenty-three times and in the sequence or grouping 4—5—5—3—6. Upon the transmission of the first group of shifts in the frequency of the control signal, the control signal will be shifted from signal frequency $F_1$ to signal frequency $F_2$, from signal frequency $F_2$ to signal frequency $F_1$, from signal frequency $F_1$ to signal frequency $F_2$ and from signal frequency $F_2$ to signal frequency $F_1$. The first shift in the frequency of the control signal, from signal frequency $F_1$ to signal frequency $F_2$, is received at the terminals 10 and 11 of the alarm system. Filter-rectifier 15 will now develop maximum impedance to the signal and a voltage will be fed from the filter-rectifier 15 to energize the winding 33 of the polar relay 30. It is to be noted that the delay relay 22 will remain operated due to the charge on capacitor 23 during the shift in frequency of the control signal from signal frequency $F_1$ to signal frequency $F_2$, the capacitor 23 being recharged by the presence of signal frequency $F_2$. Both relays 22 and 25 will remain operated. Upon the energization of winding 33 of polar relay 30 by the voltage fed thereto from filter-rectifier 15, the armature 78 will disengage contact 77 and engage contact 79. However, the voltage fed to the winding 33 must be sufficiently greater than that fed to winding 34 to overcome the field set up by the winding 34 to hold the armature 78 at the last made contact position, which in this case is contact position 77.

When the armature 78 engages contact 79 of polar relay 30, a path is completed from the positive terminal 35 to ground including lead 36, contact 79 and armature 78 of polar relay 30, capacitor 37, the winding of pulsing relay 38 and lead 26. The winding of pulsing relay 38 is energized and capacitor 37 is charged. Pulsing relay 38 operates and a path is completed from the A.C. voltage terminal 1 to ground including rectifier 2, lead 3, lead 39, contact 80 and armature 81 of pulsing relay 38, lead 40, the winding of stepping relay 41 and lead 42. Stepping relay 41 is operated, the operation thereof driving a mechanical driving means 43. The wiper arm 4 of hunting switch 5 and a wiper arm 48 of hunting switch 49 are connected to and driven by the driving means 43. Separate hunting switches 5 and 49 are shown for ease of description. The two hunting switches, however, would in actual practice be included in a single switching mechanism well known in the art. Hunting switch 5 comprises twenty-six contact positions, 94 through 119, and a wiper arm 4 mounted centrally of the switch so that it may be rotated from one of the contact positions to the next. In the arrangement shown in Fig. 2, the contact positions are arranged in a half circle, the wiper arm 4 extending across the mouth thereof from contact position 94 to contact position 119 and mounted so that the wiper arm 4 will always be in engagement with at least one of the contact positions of the switch 5. The hunting switch 49 is of similar construction as switch 5 and includes twenty-six contact positions, 120 through 145. The wiper arms 4 and 48 of the respective switches 5 and 49 are rotated in the switches in a clockwise direction by driving means 43. Both of the switches 5 and 49 will be arranged in the alarm system so that as wiper arm 4 of hunting switch 5 is rotated from one of the contact positions to the next, the wiper arm 48 of hunting switch 49 will be rotated between correspondingly positioned contact positions of switch 49.

When stepping relay 41 is operated, driving means 43 will cause wiper arm 4 to rotate from contact position 94 to contact position 95 of hunting switch 5. Similarly, wiper arm 48 of hunting switch 49 will be rotated from contact position 120 to contact position 121 of switch 49 by driving means 43. The operating circuit of delay relay 6 will be broken, but delay relay 6 will not be inactivated. The charge on capacitor 7 will hold the winding of delay relay 6 energized and the delay relay will remain operated. When the pulsing relay 38 is operated, a path is completed from the A.C. voltage terminal 1 to ground including rectifier 2, lead 3, lead 39, armature 85 and contact 84 of delay relay 6, lead 46, contact 82 and armature 83 of pulsing relay 38, lead 47 and the winding of delay relay 6. Capacitor 7 across the winding of delay relay 6 will be recharged sufficiently to hold delay relay 6 in an operated condition.

In the meantime, the frequency of the signal being received at terminals 10 and 11 is shifted a second time from signal frequency $F_2$ to signal frequency $F_1$. Filter rectifier 14 will now be selective to the signal and winding 29 of polar relay 30 will be energized. Armature 78 will disengage contact 79 and engage contact 77 of the transfer contacts of the polar relay. Both sides of capacitor 37 are now connected to ground, the operation of the polar relay 30 serving to ground capacitor 37 over a path including armature 78 and contact 77 and lead 56. The charge on capacitor 37 will leak off to ground causing a current to flow through the winding of pulsing relay 38. Pulsing relay 38 will operate and the sequence previously described will be repeated. Stepping relay 41 is operated to drive the driving means 43 to rotate wiper arm 4 of hunting switch 5 and wiper arm 48 of hunting switch 49 to the next contact positions of the respective switches. The frequency of the signal received at terminals 10 and 11 will be shifted two more times and the alarm system will operate in the same manner to cause the wiper arms 4 and 48 to rotate, contact position by contact position, to the fifth contact positions of the hunting switches 5 and 49, respectively. When wiper arm 5 engages contact position 98 of hunting switch 5, a patch is completed from A.C. voltage terminal 1 to ground including rectifier 2, lead 3, lead 39, lead 50, lead 60, contact position 98 and wiper arm 4 of hunting switch 5 and the winding of delay relay 6. The capacitor 7 across the winding of delay relay 6 will be recharged and the delay relay 6 will be held operated. The alarm system will have completed one cycle of operation, the first group of four shifts in frequency of the signal transmitted by the central station having been received and recorded by the positioning of wiper arm 4 at contact position 98 of hunting switch 5. The wiper arm 48 of switch 49 will be positioned at contact position 124 of the switch.

After a short pause, the selective equipment at the central station will be operated to transmit the second group of shifts in frequency of the control signal. The control signal will be shifted five more times. The alarm system is operated in exactly the same sequence of operation as previously described. However, wiper arms 4 and 48 of hunting switches 5 and 49, respectively, are rotated so that, upon the fifth shift in frequency the wiper arms will engage the tenth contact positions of the respective switches. A path will be completed from the A.C. voltage terminal 1 to ground including contact position 103 of hunting switch 5 and the winding of delay relay 6 rather than contact position 98, as before. The third group of five shifts in frequency will then be received. The wiper arms 4 and 48 are rotated and, upon the fifth shift in frequency, engage the fifteenth contact positions of the respective hunting switches 5 and 49. Delay relay 6 will be held in an operated condition by a path completed from A.C. voltage terminal 1 to ground including contact position 108 and wiper arm 4 of hunting switch 5. Similarly, the next two groups of shifts in frequency (3—6) recived by the alarm system will operate the alarm system to rotate the wiper arms 4 and 48 of hunting switches 5 to 49, respectively, first to the eighteenth contact positions of the respective switches and then to the twenty-fourth contact positions thereof. When the twenty-third shift in frequency has been received, the control signal will have been completed. When wiper arm 4 engages contact position 117 of hunting switch 5, a path will be completed from the A.C. voltage terminal 1 to ground including rectifier 2, lead 3, lead 39, lead 50, contact position 117 and wiper arm 4 of hunting switch 5 and the winding of delay relay 6. Delay relay 6 will be held operated in the same manner as when wiper arm 4 engages contact positions 94, 98, 103, 108 and 111 of the hunting switch 5. The positioning of wiper arm 4 at contact positions 98, 103, 108, 111 and 117 of hunting switch 5 and the positioning of wiper arm 48 at contact positions 124, 129, 134, 137 and 143 of hunting switch 49 by the operation of the alarm system is shown by dotted lines in Fig. 2.

When the wiper arm 48 engages contact position 143 of hunting switch 49, a path will be completed from the A.C. voltage terminal 1 to ground including rectifier 2, lead 3, lead 39, armature 88 and contact 87 of delay relay 6, lead 51, contact position 143 and wiper arm 48 of hunting switch 49 and indicating device 52. The indicating device 52 is shown as a bell. However, any suitable control circuit could be utilized including a light or some other alarm device. The indicating device 52 will be energized alerting an operator at the subscriber's station A that the central station has a message. The operator will operate the transmitting-receiving equipment at the subscriber's station notifying the operator at the central station that he may proceed. In operating the transmitting-receiving equipment at the subscriber's station, switch 52 will be closed. If voice transmission is used, the switch 52 could be included in the cradle support for a microphone so that, when the operator lifts the microphone, the switch 52 will be closed. In any case, upon the completion of the channel of operation between the central station and subscriber's station A by either manual or automatic means, switch 52 is closed.

Upon the closure of switch 52, a path is completed from A.C. voltage terminal 1 to ground including rectifier 2, lead 3, lead 39, switch 52, lead 40, the winding of stepping relay 41 and lead 42. The stepping relay 41 will operate and driving means 43 will rotate the wiper arm 4 to contact position 118 and the wiper arm 48 to contact position 144 of the respective hunting switches 5 and 49. The operating circuit of delay relay 6 is broken and, as soon as the charge on capacitor 7 has leaked off (there being no voltage fed to the capacitor 7 to hold the charge), delay relay 6 will be inactivated.

In addition to the wiper arms 4 and 48, the mechanical driving means 43 is connected to and rotates a cam wheel 44 in a counter-clockwise direction. A pair of projections 45 are positioned 180° apart on the periphery of the wheel 44 and serve to operate the arm of a switch 53. When the wiper arms 4 and 48 are set to engage the first contact positions of the hunting switches 5 and 49, respectively, the wheel 44 is positioned so that a projection 45 holds the switch 53 in an open condition. As the wiper arms 4 and 48 are rotated from the first contact positions to other contact positions of the respective hunting switches 5 and 49, the wheel 44 will also be rotated so that the projection 45 will disengage the arm of switch 53, closing the switch. Therefore, when wiper arms 4 and 48 are rotated to engage the twenty-fifth contact positions of the respective hunting switches 5 and 49, the wheel 44 will be positioned in such a manner that a projection 45 is not in engagement with the arm of switch 53, the switch 53 being closed.

Upon the inactivation of delay relay 6, a path will be completed from the A.C. voltage terminal 1 to ground including rectifier 2, lead 3, lead 39, armature 85 and contact 86 of delay relay 6, lead 57, contact 93 and armature 92 of stepping relay 41, switch 53, the winding of stepping relay 41 and lead 42. Relay 41 will operate and cause the driving means 43 to rotate the wiper arm 4 of hunting switch 5 to contact position 119 thereof and wiper arm 48 of hunting switch 49 to contact position 145 thereof. Driving means 43 will also rotate cam wheel 44 such that a projection 45 will engage and open switch 53, preventing any further operation of stepping relay 41. When the wiper arm 4 engages contact position 119 of hunting switch 5, it will have been rotated 180°. The opposite end of the wiper arm 4 will engage contact position 94 of hunting switch 5, and the wiper arm 4 will once again connect contact positions 94 and 119 of the switch. Similarly, the wiper arm 48 will connect contact position 120 and contact position 145 of the hunting switch 49. A path will be completed from the A.C. voltage terminal 1 to ground through rectifier 2, lead 3, contact position 94 and wiper arm 4 of hunting switch 5 and the winding of delay relay 6. Delay relay 6 is operated and capacitor 7 across the winding of delay relay 6 will be recharged. The alarm system will have completed a full sequence of operation, the alarm system having been returned to the original standby condition.

During the period that delay relay 6 is inactivated, the operating circuit of relay 22 and, therefore, the operating circuit of relay 25 will be broken by the disengagement of armature 90 and contact 89 of delay relay 6. Further, a path will be completed from capacitor 23 to ground including lead 21, armature 90 and contact 91 of delay relay 6 and lead 58. The charge on capacitor 23 will leak off to ground, inactivating relay 22 immediately upon the inactivation of delay relay 6. If, when delay relay 6 is reoperated, a control signal is being received at terminals 10 and 11, capacitor 23 will be recharged and relays 22 and 25 will be operated in the manner previously described.

Referring to hunting switch 5, it may be seen that the switch is arranged to include a "home" contact position 94 and "wanted" contact positions 98, 103, 108, 111 and 117. As long as the wiper arm 4 is rotated from the "home" position to a "wanted" position or between "wanted" positions, the alarm system will operate to energize the indicating device 52 upon the wiper arm 4 being positioned at the last "wanted" position, contact position 117. It is important to note that the "wanted" positions are different at the different subscriber stations. The operation of the alarm system of the invention depends on the fact that if the wiper arm 4 is caused to stop on any contact position other than a "wanted" position in the correct sequence, the alarm system will be operated to automatically rotate the wiper arm 4 back to the "home" position, or contact position 94. For example, it will be assumed that in order to contact subscriber's station B, shown in Fig. 1, the operator at the central station 70 operates the selective equipment at the central station to transmit the particular control signal for station B which includes shifts in frequency in the grouping 3—6—4—4—6. The wiper arm 4 would be rotated to contact position 97 of hunting switch 5 upon the completion of the first group of shifts in frequency. Contact position 97 is not a "wanted" position of the alarm system at subscriber's station A and the operating circuit to delay relay 6 at station A would be broken. Delay relay 6 would be inactivated and a path completed from the A.C. voltage terminal 1 to ground including rectifier 2, lead 3, lead 39, armature 85 and contact 86 of delay relay 6, lead 57, contact 93 and armature 92 of stepping relay 41, switch 53 (switch 53 being closed inasmuch as the cam wheel 44 will have been rotated simultaneously with the wiper arm 4 to cause the projection 45 to disengage the arm of switch 53), the winding of stepping relay 41 and lead 42. Stepping relay 41 will operate and becomes a self-interrupting relay in that every time the relay operates it opens contact 93 and armature 92 of the relay, breaking the operating circuit of the relay. When the relay is inactvated, the operating circuit is completed and the stepping relay 41 will be operated and so on. The stepping relay 41 will continue to operate itself until the driving means 43 has caused the cam wheel 44 to rotate to a position where a projection 45 engages the arm of switch 53, opening the switch 53. When this happens, the operating circuit of stepping relay 41 will be broken and the relay will cease to operate. The wiper arm 4 of hunting switch 5 and, of course, the wiper arm 48 of hunting switch 49 will have been rotated to the "home" position or contact positions 94 and 120 of the respective hunting switches, and the hunting switches 5 and 49 will have been returned to the original condition. When the succeeding groups of shifts in frequency (6—4—4—6) are received, the wiper arm 4 of hunting switch 5 will again be rotated to an unwanted contact position, and the stepping relay 41 will operate to return the wiper arm 4 of hunting switch 5 and the wiper arm 48 of hunting switch 49 to the "home" position or contact positions 94 and 120 of the respective hunting switches in the same manner.

Any sequence of shifts in frequency of the control signal other than the correct one cannot operate the alarm system of the invention. This is so because, upon the reception of an incorrect control signal, the alarm system will operate to position the wiper arm 4 on a contact position of hunting switch 5 other than a "wanted" position. The stepping relay 41 is automatically operated to return the wiper arm 4 of the hunting switch 5 to the "home" position or contact position 94. Simultaneously, of course, the wiper arm 48 of hunting switch 49 will also be returned to contact position 120 of that switch. Only the correct sequence of shifts in the frequency of the control signal will cause the hunting switches 5 and 49 to complete a full sequence of operation before returning to their original condition, having energized the indicating device 52 alerting the subscriber's station to an incoming call. By arranging each of the alarm systems located at each of the subscriber's station in a communications system to respond to a different sequence of shifts in the frequency of the control signal transmitted by a central station, only one of the alarm systems will respond to a particular control signal transmitted by the central station. Only the subscriber's station including the alarm system responding to the particular control signal will be alerted to the incoming call. A selective communication system is, therefore, provided.

A feature of the invention is the fact that the alarm system is fairly insensitive to noise pulses and other electrical interference. The noise pulses must be large enough in amplitude and long enough in duration to charge capacitor 23. Without capacitor 23 being properly charged, relay 22 and, therefore, relay 25 are not operated to complete the circuit between the filter-rectifiers 14 and 15 and the windings 29 and 33, respectively, of the polar relay 30. Mention has been made of the fact that rectifier 9 is biased by the resulting D.C. voltage fed from rectifier 2 over a path including potentiometer 8 to rectifier 9. Any noise pulses fed to the winding of relay 22 which are of sufficient amplitude to energize the winding but of improper duration will be clipped by the action of the biased rectifier 9, the peak of such pulses being fed to ground through rectifier 9 and potentiometer 8. By adjusting the bias on rectifier 9, the response of the relay 22 to incoming signal pulses can, therefore, be controlled such that pulses of large amplitude and short duration will not energize the winding of relay 22.

Even if relay 22 and, consequently, relay 25 were operated by noise pulses, in order to operate the polar relay 30, the noise pulses must be of a frequency to which one of the filter rectifiers 14 or 15 is selective. The noise pulses, if of one of the two frequencies must be of that frequency to which the filter-rectifier is selective that will develop of a voltage sufficient in amplitude to energize a winding of polar relay 30 to move the armature 78 to the opposite contact of the transfer contacts of the polar relay 30 from that at which it is being held by the winding 34 of the polar relay. The pulses will also have to be of sufficient amplitude to overcome the field set up by the winding 34 to hold the armature 78 at the last made contact position of the polar relay. These requirements greatly reduce the possibility of accidental operation of the alarm system by any signal other than the correct control signal.

Having described the invention, we claim:

1. A radio alarm system comprising, in combination, a source of signal energy in the form of a calling signal including a series of impulses each of a given amplitude and duration, said impulses alternating in frequency between a first and a second frequency and grouped in accordance with a predetermined code, first and second selective filter-rectifiers each connected to said source, a polar relay having first and second windings and an armature adapted to engage either of two oppositely disposed contacts, a relay circuit having a given delayed response connected to said source and including a first switching means connected between the output circuit of said first filter-rectifier and said first winding and also including a second switching means connected between the output circuit of said second filter-rectifier and said second winding, said relay circuit being responsive only to impulses of said amplitude and duration from said source to connect the output circuit of said first filter-rectifier through said first switching means to said first winding and the output circuit of said second filter-rectifier through said second switching means to said second winding, said first filter-rectifier being responsive to each impulse of said first frequency in said series to energize said first winding and said second filter-rectifier being responsive to each impulse of said second frequency in said series to energize said second winding so that said armature is made to alternately engage said contacts according to the grouping of the impulses in said series, an indicating device, a switching mechanism connected to said indicating device, and means connected to said armature and to said switching mechanism and responsive to the movement of said armature between said contacts to cause said switching mechanism to operate said indicating device only when the impulses in said series are grouped according to said code.

2. A radio alarm system as claimed in claim 1 and wherein said relay circuit includes an electromagnetic relay device having a winding, a capacitor connected across the winding of said relay device and to said source, and means for causing said capacitor to be charged sufficiently to energize said last-mentioned winding only in response to the reception by said capacitor of impulses of said amplitude and duration from said source.

3. A radio alarm system comprising, in combination, a source of signal energy in the form of a calling signal including a series of impulses each of a given amplitude and duration, said impulses alternating in frequency between a first and a second frequency and grouped in accordance with a predetermined code, first and second selective filter-rectifiers each connected to said source, a polar relay having first and second windings and an armature adapted to engage either of two oppositely disposed contacts, a relay circuit having a given delayed response connected to said source and including a first switching means connected between the output circuit of said first filter-rectifier and said first winding and also including a second switching means connected between the output circuit of said second filter-rectifier and said second winding, said relay circuit being responsive only to impulses of said amplitude and duration from said source to connect the output circuit of said first filter-rectifier through said first switching means to said first winding and the output circuit of said second filter-rectifier through said second switching means to said second winding, said first filter-rectifier being responsive to each impulse of said first frequency in said series to energize said first winding and said second filter-rectifier being responsive to each impulse of said second frequency in said series to energize said second winding so that said armature is made to alternately engage said contacts according to the grouping of the impulses in said series, an indicating device, a switching mechanism connected to said indicating device and including a number of contact positions and a wiper arm, a stepping relay coupled to said armature and to said wiper arm and responsive to the movement of said armature between said contacts for causing said wiper arm to selectively engage said contact positions so that said switching mechanism operates said indicating device only when the impulses in said series are grouped according to said code.

4. A radio alarm system comprising, in combination, a source of signal energy in the form of a calling signal including a series of impulses each of a given amplitude and duration, said impulses alternating in frequency between a first and a second frequency and grouped in accordance with a predetermined code, first and second selective filter-rectifiers each connected to said source, a polar relay having a first and second winding and an armature adapted to engage either of two oppositely disposed contacts, a relay circuit having a given delayed response connected to said source and including a first contact means connected between the output circuit of said first filter-rectifier and said first winding and also including a second contact means connected between the output circuit of said second filter-rectifier and said second winding, said relay circuit being responsive only to impulses of said amplitude and duration from said source to connect the output circuit of said first filter-rectifier through said first contact means to said first winding and the output circuit of said second filter-rectifier through said second contact means to said second winding, said first filter-rectifier being responsive to each impulse of said first frequency in said series to energize said first winding and said second filter-rectifier being responsive to each impulse of said second frequency in said series to energize said second winding so that said armature is made to alternately engage the contacts of said polar relay according to the grouping of the impulses in said series, means for connecting one of the polar relay contacts to a point of reference potential, means for connecting the other of the polar relay contacts to the terminal of a source of potential different from said reference potential, a capacitor connected to said armature, an indicating device, a hunting switch connected to said indicating device and including a number of contact positions and a wiper arm, a stepping relay coupled to said capacitor and to said wiper arm and responsive to the charging and discharging of said capacitor by the movement of said armature between the polar relay contacts for causing said wiper arm to selectively engage said contact positions so that said hunting switch operates said indicating device when the impulses in said series are grouped according to said code, and means connected to certain of said contact positions for controlling the movement of said wiper arm between said contact positions to permit the operation of said indicating device by said hunting switch only when the impulses in said series are grouped according to said code.

5. A radio alarm system as claimed in claim 4 and wherein said relay circuit includes an electromagnetic relay device having a winding, a second capacitor connected across the winding of said relay device and to said source, and means for causing said second capacitor to be charged sufficiently to energize said last-mentioned winding only in response to the reception by said second capacitor of impulses of said amplitude and duration from said source.

6. A radio alarm system as claimed in claim 4 and wherein said polar relay includes a third winding, said system including means for energizing said third winding according to the movement of said armature between said polar relay contacts so that said armature is held in engagement with the last of said polar relay contacts to which said armature was moved.

References Cited in the file of this patent

UNITED STATES PATENTS

| | | |
|---|---|---|
| 1,888,985 | Hershey | Nov. 29, 1932 |
| 1,896,487 | Gibson | Feb. 7, 1933 |
| 2,198,901 | Boswau | Apr. 30, 1940 |
| 2,379,631 | Finckh | July 3, 1945 |
| 2,543,608 | Stamper | Feb. 27, 1951 |

FOREIGN PATENTS

| | | |
|---|---|---|
| 151,403 | Australia | Apr. 30, 1950 |